INVENTOR.
EDWARD F. FLINT

BY Vincent N. Cleary

ATTORNEY

United States Patent Office 3,272,910
Patented Sept. 13, 1966

3,272,910
BUOYANCY SYSTEM FOR UNDERWATER
CONDUCTOR CABLE
Edward F. Flint, Fullerton, Calif., assignor to North
American Aviation, Inc.
Filed Sept. 21, 1964, Ser. No. 398,014
2 Claims. (Cl. 174—101.5)

This invention relates to an underwater cable and more specifically to an underwater cable for supporting electrical conductors or cables.

In utilizing underwater work vehicles which are remotely controlled to perform various functions underwater, it is, of course, necessary to employ a cable between a ship and the underwater vehicle. This cable provides the electrical power and electrical control conductors to power and control the vehicle. It is frequently desirable to employ these vehicles in relatively deep water. Because of the length and weight of these cables they are not buoyant. For this reason, it is necessary to provide some buoyancy means to prevent the long extension cables from snagging or interfering with the operation of the underwater vehicle. In addition, it is highly desirable that such a buoyancy material be easily wound for storage when the underwater vehicle is returned to surface.

Accordingly, an object of the invention is to provide a new and improved underwater cable for electrical conductors.

Still another object of this invention is the provision of an underwater cable that can be extended downwardly into very deep water to control an underwater vehicle yet be buoyant adjacent to the vehicle to prevent the cable from interfering with the vehicle.

A still further object of the invention is to provide an underwater buoyancy cable which is buoyant yet is easy to wind on a winding assembly when it is returned to the surface or a ship.

A feature of the present invention is an underwater cable for electrical conductors or cables which has a plurality of conductors longitudinally disposed therein. The cable is kept buoyant by a plurality of discrete buoyant members which are longitudinally disposed of the cable. By positioning these members longitudinally, the cable is maintained buoyant in very deep water, but in addition, can be wound easily for storage in a relatively small area or volume.

Other objects and advantages of the present invention will be more clearly understood from the following description of a preferred embodiment taken in conjunction with the accompanying drawings in which.

Figure 1:
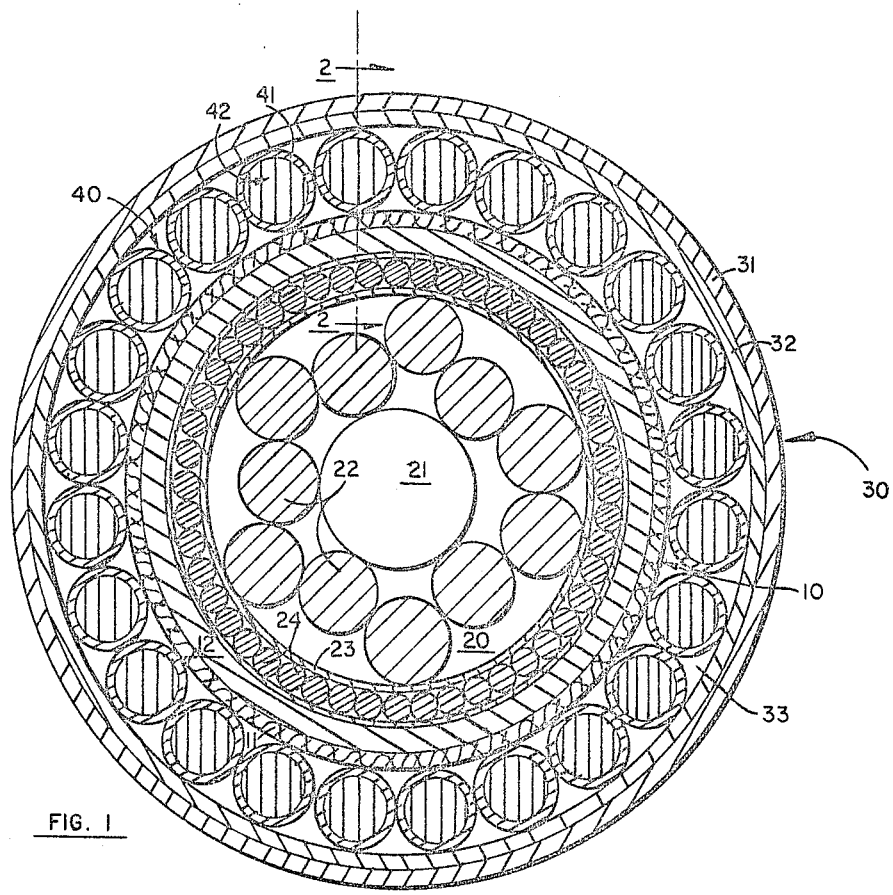
FIG. 1 is a cross-sectional view of an underwater cable embodying the invention.

A cross-sectional view of an embodiment of the invention is illustrated in FIG. 1 and includes a first flexible tubular means or assembly 10 having an outer flexible tubular member 11 made of, for example, polyethylene, and inner flexible tubular member 12 made of, for example, polyethylene fibers. Inside the tubular assembly 10 is electrical conductor assembly 20 which comprises a plurality of electrical cables longitudinally disposed within the tubular water tight assembly 10. FIG. 1 illustrates by way of example an arrangement of electrical conductor elements which include a center cylindrical co-axial cable casing 21 which can contain various sizes of electrical conductors, however, is not shown in detail in FIG. 1. Surrounding the casing 21, by way of example, is a plurality of shielded cables 22 which are circumferentially disposed about the casing 21. In order to secure the electrical cables 22 to the casing 21, a Mylar tape 23 can be employed. Circumferentially disposed between the inner surface of tubular member 12 and the outer surface of tube 23 are electrical cables 24 having a relatively small diameter. Electrical cables 24 are longitudinally disposed with respect to the conductors 22 and the tubular assembly 10. It will be understood that the electrical cable assembly 20 is shown by way of example only and that other arrangements of electrical cable which are longitudinally disposed with respect to the tubular assembly 10 can be easily adapted to employ the invention. It will be understood that all the individual cables are electrically insulated from each other.

The above mentioned cables 22, 24 and cables in casing 21 are employed to transmit signals or power to an underwater vehicle. Members 11 and 12 provide a water tight seal around these conductors. Further, the entire assembly is water tight.

Exterior of and surrounding the tubular assembly 10 is a second flexible tubular assembly 30 having an inner tubular member 32 and an outer flexible tubular jacket member 31 preferably made of steel braid. The tubular assembly 10 is mounted longitudinally of and concentric with the outer water tight tubular assembly 30 such that the inner surface of flexible tubular member 32 and outer surface of tubular member 11 provides a longitudinally disposed cylindrical water tight chamber 33.

Thirty-two (32) is the strength member which permits a winch to grip the cable. Thirty-one (31) is a covering of steel braid which provides protection for the inner cables under rough handling conditions.

The tubular assembly 30 and 10 including tubular members 11, 12, 31 and 32 are all, as defined above, flexible. Mounted in the cylindrical chamber 33 is a circumferentially disposed buoyancy assembly 40. The buoyancy assembly 40 includes a plurality of flexible longitudinally disposed flexible tubular members 41.

Figure 2:
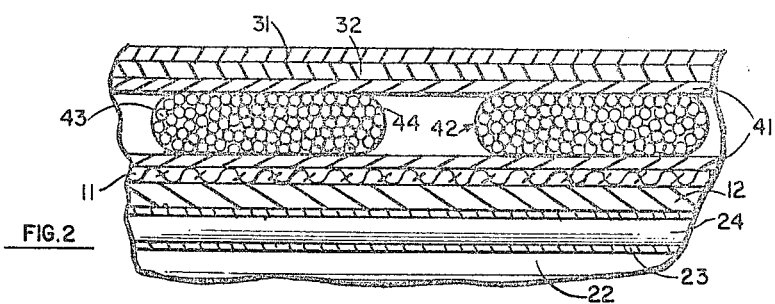
FIG. 2 is a cross-sectional view taken along lines 2—2 of FIG. 1.

As shown in FIG. 2, within the longitudinally disposed tubular members 41 are a plurality of discrete longitudinally disposed buoyancy members 42.

The members 42 are preferably cylindrical with hemispherical ends. The elements 42 are cellular, that is, having air cells to effect buoyancy. A preferred construction of elements 42 utilizes small hollow glass balls 43 of about .004 inch diameter that are filled with air. These balls are then mounted in an epoxy 44 that provides support and strength or stiffness for the elements 42. The amount of buoyancy achieved depends upon the number of balls 43 mixed in with the epoxy.

Figure 3:
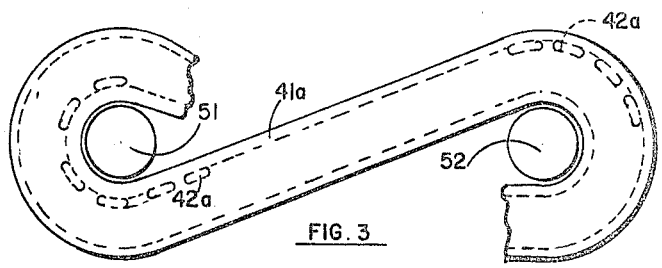
FIG. 3 illustrates the cable shown in FIG. 1 in a wound position.

Utilizing these buoyant members 42 positioned longitudinally of the cable as well as longitudinally of and within the tubular supports 41, facilitates easy winding of the cable when it is returned to surface. The member 42 is spaced a distance depending on the flexibility desired of the cable and the required buoyancy. As shown in FIG. 3, the cable can be easily wound in a figure eight around a first winding post 51 and a second winding post 52. One of the tubular members 41a is illustrated in dotted lines in FIG. 3 as the cable is wound in a figure eight fashion. The tubular member 41a with the inserted plurality of buoyant members 42a is shown when the cable is wound in a figure eight. As shown in FIG. 3, the buoyant members 42a which are wound about the post 51 will tend to be pushed together and exert a pressure longitudinally away from the post 51 in tube 41a. Due to the buoyant members 42a being longitudinally disposed with respect to the cable, this pressure is taken up by the buoyant members 42a which are being wound on the outer side of the cable about winding post 52. Thus, it is seen that the buoyant members 42 provide a maximum of buoyancy to the cable yet being longitudinally disposed with respect to the cable can be easily wound when the cable is returned to the surface. Further, the members 42 being made of a stiff solid material will not collapse under heavy pressure in deep water. As a result, buoyancy is maintained even in very deep water.

Although the invention has been described and illustrated in detail, it is to be clearly understood that the same is by way of illustration and example only and is not to be taken by way of limitation, the spirit and scope of this invention limited only by the terms of the appended claims.

I claim:

1. An underwater buoyancy cable for electrical conductors comprising a first flexible tubular member having a plurality of electrical conductors longitudinally disposed therein, a relatively large second flexible tubular member, said first tubular member longitudinally disposed within said second tubular member to form a longitudinal chamber between the outer surface of said first tubular member and the inner surface of said second tubular member, a third relatively small flexible tube extending longitudinally of said longitudinal chamber, and a plurality of cellular buoyancy members longitudinally disposed within said tubular member.

2. An underwater buoyancy cable for electrical conductors comprising a first flexible tubular member having a plurality of electrical conductors longitudinally disposed therein, a relatively large second flexible tubular member, said first tubular member longitudinally disposed within said second tubular member to form a cylindrical chamber to form the outer surface of said first tubular member and the inner surface of said second tubular member and a plurality of flexible third tubular members longitudinally disposed within said cylindrical chamber with each of said third tubular members having a plurality of cellular stiff buoyancy members longitudinally disposed therein.

References Cited by the Examiner
UNITED STATES PATENTS

| | | | |
|---|---|---|---|
| 2,424,388 | 4/1947 | Duna | 174—101.5 |
| 2,553,798 | 4/1951 | Van Deventer | 9—8 |

FOREIGN PATENTS

| | | |
|---|---|---|
| 706,231 | 3/1954 | Great Britain. |

LEWIS H. MYERS, *Primary Examiner.*

E. GOLDBERG, *Assistant Examiner.*